(12) United States Patent
Amit

(10) Patent No.: US 10,203,455 B2
(45) Date of Patent: Feb. 12, 2019

(54) MULTI-CHANNEL OPTICAL TRANSMITTER AND METHODS OF MAKING AND USING THE SAME

(71) Applicant: Source Photonics (Chengdu) Co., Ltd., Chengdu (CN)

(72) Inventor: Moshe Amit, West Hills, CA (US)

(73) Assignee: Source Photonics (Chengdu) Co., Ltd., Chengdu (CN)

(*) Notice: Subject to any disclaimer, the term of this patent is extended or adjusted under 35 U.S.C. 154(b) by 47 days.

(21) Appl. No.: 15/319,334

(22) PCT Filed: Dec. 13, 2016

(86) PCT No.: PCT/CN2016/109709
§ 371 (c)(1),
(2) Date: Dec. 15, 2016

(87) PCT Pub. No.: WO2018/107367
PCT Pub. Date: Jun. 21, 2018

(65) Prior Publication Data
US 2018/0164515 A1    Jun. 14, 2018

(51) Int. Cl.
*G02B 6/42* (2006.01)
*G02B 6/293* (2006.01)
(Continued)

(52) U.S. Cl.
CPC ......... *G02B 6/29365* (2013.01); *G02B 6/425* (2013.01); *G02B 6/4214* (2013.01);
(Continued)

(58) Field of Classification Search
None
See application file for complete search history.

(56) References Cited

U.S. PATENT DOCUMENTS 4,823,357 A * 4/1989 Casey ............... G02B 6/4246
359/568
5,859,717 A * 1/1999 Scobey ............ G02B 6/29367
385/24

(Continued)

FOREIGN PATENT DOCUMENTS

CN        102890313 A      1/2013
CN        203301489 U     11/2013
(Continued)

OTHER PUBLICATIONS

International Search Report and Written Opinion; International Searching Authority/CN dated Aug. 29, 2017; International Application No. PCT/CN2016/109709; 8 pages; International Searching Authority/State Intellectual Property Office of the P.R. China; Beijing, China.

*Primary Examiner* — Michael Stahl
(74) *Attorney, Agent, or Firm* — Andrew D. Fortney; Central California IP Group, P.C.

(57) ABSTRACT

An optical transmitter including first, second, third and fourth signal generators configured to transmit first, second, third and fourth optical signals, a first filter configured to combine the first optical signal with the second optical signal to form a first multi-channel signal, a second filter configured to combine the third optical signal with the first multi-channel signal to form a second multi-channel signal, and a third filter configured to combine the fourth optical signal with the second multi-channel signal to form a third multi-channel signal. The first optical signal and the third optical signal have parallel optical axes, as do the second optical signal and the fourth optical signal. The second and fourth optical signals are at an angle of from 5° to 40° with (Continued)

respect to the first and third optical signals and are generally propagated in an opposite direction from the first and third optical signals.

20 Claims, 12 Drawing Sheets

(51) Int. Cl.
*H04B 10/50* (2013.01)
*H04J 14/02* (2006.01)
*G02B 27/10* (2006.01)
*G02B 27/14* (2006.01)
*H04B 10/40* (2013.01)

(52) U.S. Cl.
CPC ....... *G02B 6/4271* (2013.01); *G02B 27/1006* (2013.01); *G02B 27/14* (2013.01); *H04B 10/40* (2013.01); *H04B 10/506* (2013.01); *H04J 14/02* (2013.01); *H04J 14/0298* (2013.01)

(56) References Cited

U.S. PATENT DOCUMENTS

| | | | |
|---|---|---|---|
| 6,301,407 B1* | 10/2001 | Donaldson | G02B 6/29365 385/16 |
| 6,418,250 B1* | 7/2002 | Corbosiero | G02B 6/29367 385/24 |
| 9,042,423 B2 | 5/2015 | Muendel | |
| 9,215,032 B2 | 12/2015 | Zhang et al. | |
| 9,229,167 B2 | 1/2016 | Chang et al. | |
| 9,590,737 B2 | 3/2017 | Tang et al. | |
| 2003/0206688 A1* | 11/2003 | Hollars | G02B 6/29365 385/24 |
| 2003/0215240 A1* | 11/2003 | Grann | G02B 6/29367 398/85 |
| 2004/0212802 A1* | 10/2004 | Case | G02B 6/2553 356/401 |
| 2006/0251422 A1* | 11/2006 | Liu | G02B 6/4215 398/79 |
| 2008/0118243 A1* | 5/2008 | Wen | G02B 6/4214 398/43 |
| 2013/0148966 A1* | 6/2013 | Kurokawa | H04J 14/02 398/65 |
| 2014/0112618 A1 | 4/2014 | Chang et al. | |
| 2015/0003484 A1 | 1/2015 | Muendel | |
| 2015/0318951 A1 | 11/2015 | Zhang et al. | |
| 2016/0131843 A1* | 5/2016 | Amit | G02B 6/4221 385/24 |
| 2016/0216466 A1 | 7/2016 | Tang et al. | |

FOREIGN PATENT DOCUMENTS

| | | |
|---|---|---|
| CN | 103502859 A | 1/2014 |
| CN | 104870069 A | 8/2015 |
| KR | 20070020800 A | 2/2007 |

* cited by examiner

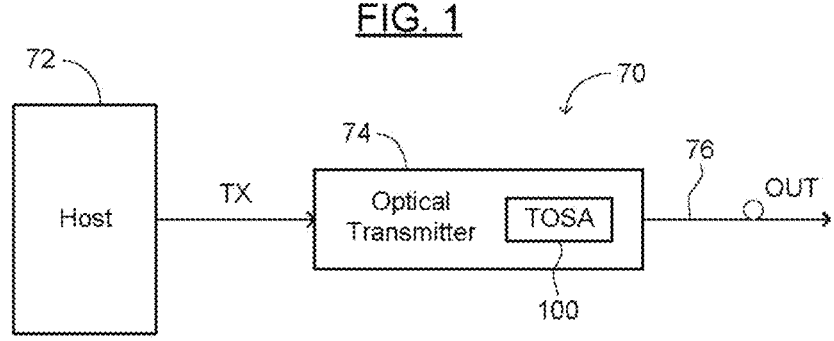
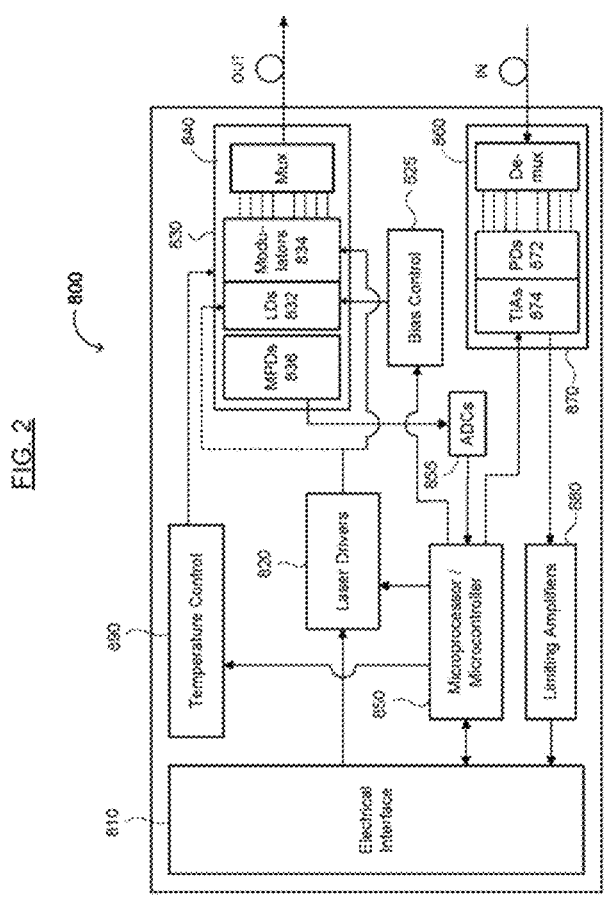

MULTI-CHANNEL OPTICAL TRANSMITTER AND METHODS OF MAKING AND USING THE SAME

FIELD OF THE INVENTION

The present invention relates to the field of optical communication, especially to a multi-channel optical transmitter and methods of making and using the same.

DISCUSSION OF THE BACKGROUND

In optical communications, optical signals carry information. For example, a transmitter in an optical or optoelectronic transceiver converts one or more electrical signals into optical signals, and a receiver in an optical or optoelectronic transceiver converts one or more optical signals into electrical signals. An objective of optical communication research and development is to increase and/or maximize bandwidth to the greatest extent possible.

At a given baud rate, the capacity of a transmitter or receiver in an optical transceiver may be limited by the number of optical channels (or wavelengths for wavelength division multiplexing systems) that a single transmitter optical subassembly or receiver optical subassembly can contain. When conventional optical components are used to multiplex and/or demultiplex a multi-channel optical signal, a minimal size and reliability are primary concerns about the system processing such signals.

As a number of multiplexed/demultiplexed channels increases, the size of the system grows considerably, in a transverse direction and/or a longitudinal direction. Where a single zig-zag path is used to combine all of the optical channels, several issues typically arise. For example, the difference in the optical path length becomes relatively large between the first channel and the last channel, making the design and alignment of lenses more difficult. Any pitch error that may arise accumulates over the increased number of channels. For example, if the first channel in an N-channel system has a small error, the error can be N times greater at the last channel. In other words, ensuring good performance becomes more difficult for each additional channel. Furthermore, the increasing size due to the increasing number of channels is undesirable, given the fixed dimensions of standard optical transceiver packages. Larger systems are also more vulnerable to index variations due to changes of temperature and/or pressure.

This "Discussion of the Background" section is provided for background information only. The statements in this "Discussion of the Background" are not an admission that the subject matter disclosed in this "Discussion of the Background" section constitutes prior art to the present disclosure and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art and provide an optical transmitter comprising a first optical signal generator configured to transmit a first optical signal, a second optical signal generator configured to transmit a second optical signal, a first filter configured to combine the first optical signal with the second optical signal to form a first multi-channel optical signal, a third optical signal generator configured to transmit a third optical signal, a second filter configured to combine the third optical signal with the first multi-channel optical signal to form a second multi-channel optical signal, a fourth optical signal generator configured to transmit a fourth optical signal, a third filter configured to combine the fourth optical signal with the second multi-channel optical signal to form a third multi-channel optical signal, and a port configured to pass a last multi-channel optical signal to an optical transmission medium. The first optical signal and the third optical signal have parallel optical axes. The second optical signal and the fourth optical signal have parallel optical axes. The second optical signal and the fourth optical signal are at an angle of from 5° to 40° with respect to the first optical signal and the third optical signal.

In some embodiments of the optical transmitter, the first filter is configured to reflect the first optical signal and pass the second optical signal, the second filter is configured to reflect the first multi-channel optical signal and pass the third optical signal, and the third filter is configured to reflect the second multi-channel optical signal and pass the fourth optical signal.

In some embodiments of the optical transmitter, the first optical signal generator and the third optical signal generator are oriented in parallel, and the second optical signal generator and the fourth optical signal generator are oriented in parallel.

In some embodiments, the optical transmitter further comprises a fifth optical signal generator configured to transmit a fifth optical signal, a fourth filter configured to combine the fifth optical signal with the third multi-channel optical signal to form a fourth multi-channel optical signal (e.g., at a point on a surface of the fourth filter at which the third multi-channel optical signal is reflected), a sixth optical signal generator configured to transmit a sixth optical signal, and a fifth filter configured to combine the sixth optical signal with the fourth multi-channel optical signal to form a fifth multi-channel optical signal (e.g., at a point on a surface of the fifth filter at which the fourth multi-channel optical signal is reflected). In such embodiments, the fifth multi-channel optical signal may be the last multi-channel optical signal.

In some embodiments, the optical transmitter further comprises a seventh optical signal generator configured to transmit a seventh optical signal, a sixth filter configured to combine the seventh optical signal with the fifth multi-channel optical signal to form a sixth multi-channel optical signal (e.g., at a point on a surface of the sixth filter at which the fifth multi-channel optical signal is reflected), an eighth optical signal generator configured to transmit an eighth optical signal, and a seventh filter configured to combine the eighth optical signal with the sixth multi-channel optical signal to form a seventh multi-channel optical signal (e.g., at a point on a surface of the seventh filter at which the sixth multi-channel optical signal is reflected). In such embodiments, the seventh multi-channel optical signal may be the last multi-channel optical signal.

In some embodiments, the optical transmitter further comprises a housing configured to enclose the optical signal generators and the filters. In other or further embodiments, the optical transmitter further comprises a block configured to support the filters, the block having at least a first pair of parallel sides and a second pair of parallel sides. For example, the odd-numbered filters and the even-numbered filters may be on opposite sides of the first or second pair of parallel sides.

In some embodiments, the optical transmitter further comprises first through fourth lenses through which the first through fourth optical signals respectively pass. The second through fourth optical signals pass through the second through fourth lenses respectively before they enter the first through third filters.

In some embodiments of the optical transmitter, each of the first optical signal through the fourth optical signal are separated in wavelength from each other by at least 0.4 nanometers. In other or further embodiments of the optical transmitter, each of the first optical signal generator through the fourth optical signal generator comprises a laser diode. For example, the laser diodes may each comprise a diffused feedback (DFB) laser, an electromodulated laser (EML), etc. Alternatively, the laser diodes may each comprise a light-emitting diode (LED).

In some embodiments, the optical transmitter further comprises a thermoelectric cooler configured to cool the optical signal generators. In other or further embodiments, the optical transmitter further comprises one or more reflective surfaces (e.g., mirrors) configured to align the last multi-channel optical signal with the optical transmission medium.

The present invention also encompasses a method of forming a multi-channel optical output signal, comprising combining a first optical signal with a second optical signal to form a first multi-channel optical signal; combining a third optical signal with the first multi-channel optical signal to form a second multi-channel optical signal; combining a fourth optical signal with the second multi-channel optical signal to form a third multi-channel optical signal; and passing a last multi-channel optical signal to an optical transmission medium. The first optical signal and the third optical signal have parallel optical axes. The second optical signal and the fourth optical signal have parallel optical axes and have a propagation direction opposed to a propagation direction of the first optical signal and the third optical signal, but at an angle of from 5° to 40° with respect to the first optical signal and the third optical signal.

In some embodiments, the method may further comprise transmitting the first through transmitting fourth optical signals; reflecting the first optical signal from a first filter; passing the second optical signal through the first filter (e.g., at a point on a surface of the first filter at which the first optical signal is reflected); reflecting the first multi-channel optical signal from a second filter; passing the third optical signal through the second filter (e.g., at a point on a surface of the second filter at which the first multi-channel optical signal is reflected); reflecting the second multi-channel optical signal from a third filter; and/or passing the fourth optical signal through the third filter (e.g., at a point on a surface of the third filter at which the second multi-channel optical signal is reflected).

In some embodiments, the method further comprises transmitting a fifth optical signal (e.g., through a fourth filter); combining the fifth optical signal with the third multi-channel optical signal to form a fourth multi-channel optical signal (e.g., at a point on a surface of the fourth filter at which the third multi-channel optical signal is reflected); transmitting a sixth optical signal (e.g., through a fifth filter); and/or combining the sixth optical signal with the fourth multi-channel optical signal to form a fifth multi-channel optical signal (e.g., at a point on a surface of the fifth filter at which the fourth multi-channel optical signal is reflected). In some further embodiments, the method further comprises transmitting a seventh optical signal (e.g., through a sixth filter); combining the seventh optical signal with the fifth multi-channel optical signal to form a sixth multi-channel optical signal (e.g., at a point on a surface of the sixth filter at which the fifth multi-channel optical signal is reflected); transmitting an eighth optical signal (e.g., through a seventh filter); and/or combining the eighth optical signal with the sixth multi-channel optical signal to form a seventh multi-channel optical signal (e.g., at a point on a surface of the seventh filter at which the sixth multi-channel optical signal is reflected).

The present invention also encompasses a method of fabricating an optical transmitter, comprising attaching at least four optical signal generators to a substrate, where a first optical signal generator, a second optical signal generator, a third optical signal generator and a fourth optical signal generator are configured to generate a first optical signal, a second optical signal, a third optical signal and a fourth optical signal, respectively; attaching at least three filters directly or indirectly to the substrate, where a first of the filters is aligned to combine the first optical signal with the second optical signal to form a first multi-channel optical signal, a second of the filters is aligned to combine the third optical signal with the first multi-channel optical signal to form a second multi-channel optical signal, and a third of the filters is aligned to combine the fourth optical signal with the second multi-channel optical signal to form a third multi-channel optical signal; and mounting one or more passive optical components directly or indirectly to the substrate, where the passive optical component(s) are configured to direct a last multi-channel optical signal to an optical transmission medium. The first optical signal and the third optical signal have parallel optical axes. The second optical signal and the fourth optical signal have parallel optical axes. The second optical signal and the fourth optical signal are at an angle of from 5° to 40° with respect to the first optical signal and the third optical signal.

In some embodiments of the method of fabricating, each of the optical signal generators comprises a laser diode or light-emitting diode, as described herein.

In other or further embodiments, the method of fabricating further comprises testing an alignment of the filters, the optical signal generators and the passive optical component(s), and curing an adhesive that attaches the filters, the optical signal generators and the passive optical component(s) to the substrate once aligned. These and other advantages of the present invention will become readily apparent from the detailed description of various embodiments below.

BRIEF DESCRIPTION OF THE DRAWINGS

FIG. 1 is a diagram showing an exemplary optical transmitter system.

FIG. 2 is a diagram showing components in an exemplary optoelectronic transceiver in accordance with embodiments of the invention.

DETAILED DESCRIPTION

Figure 3:
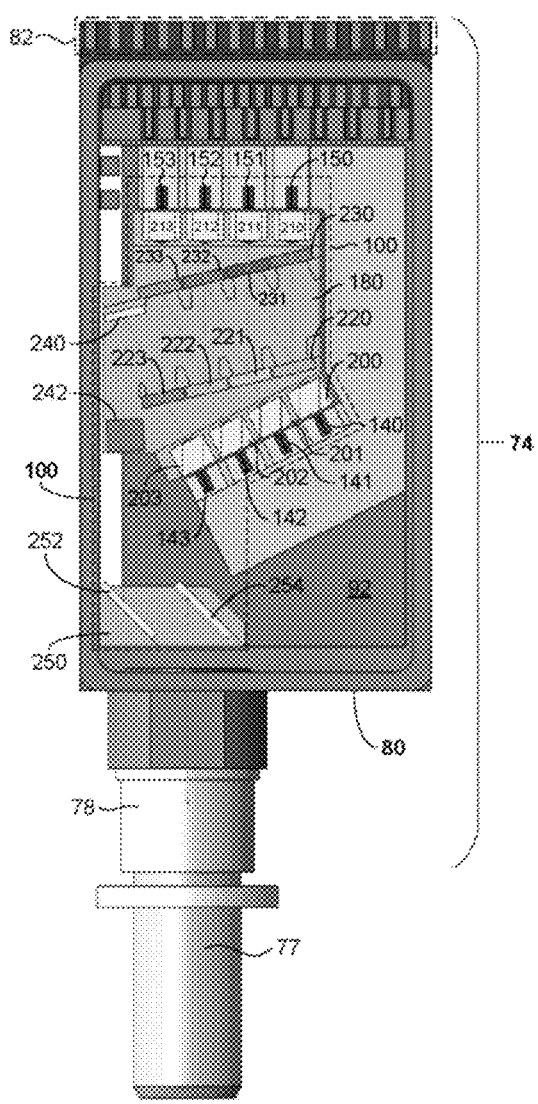
FIG. 3 is a diagram showing an exemplary optical transmitter in accordance with embodiments of the invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components and circuits have not been described in detail so as not to unnecessarily obscure aspects of the disclosure.

Some portions of the detailed descriptions which follow are presented in terms of processes, procedures, logic, functions and other symbolic representations of operations on signals, code, data bits or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring data or information from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

An Exemplary Optical System

Referring to FIG. 1, a block diagram of an exemplary optical system 70 is shown. The optical system 70 may comprise a multi-channel optical transmitter 74. The optical system 70 generally comprises a host 72, an optical transmitter or module 74, and an optical transmission medium (e.g., an optical cable) 76. The optical transmitter 74 may comprise a transmitter optical subassembly (TOSA) or module 100. An electrical input signal (e.g., TX) may be transmitted from the host 72 to the optical transmitter_74. The signal TX generally conveys digital information in electrical form to be transmitted by the optical transmitter 74 in optical form. An optical output signal (e.g., OUT) may be transmitted from the optical transmitter_74 over the transmission medium 76. The signal OUT may convey the digital information from the electrical input signal as optically modulated light over multiple channels.

The optical transmitter_74 is generally operational to convert digital data received electrically in the signal TX to an optical signal OUT. Where the digital data comprises parallel input signals, the optical transmitter_74 may be operational to convert the parallel signals into a serial signal. Where the digital data is received in a fewer number or a greater number of channels than the N channels of the signal OUT, the optical transmitter_74 may be operational to multiplex or demultiplex the digital data channels into the N optical channels of the signal OUT.

The transmission medium 76 may comprise a fiber optical cable. The transmission medium 76 may be operational to carry the multi-channel optical signal OUT over long distances. There may be minor signal degradation and/or attenuation over such distances, as is known in the art.

Exemplary Optical Transmitters

Referring to FIG. 2, a block diagram of an exemplary implementation of an optical transceiver 800 is shown. The optical transceiver 800 may implement and/or comprise an electrical to multi-channel optical converter, an optical transmitter, a multi-channel optical to electrical converter and an optical receiver. In various embodiments, the number of channels may be, but is not limited to, four or more channels (e.g., four, eight, twelve or sixteen channels). Other numbers of channels may be implemented to meet the design criteria of a particular application.

The optical transceiver 800 generally comprises an electrical interface 810, a microprocessor or microcontroller (MCU) 850, one or more laser drivers 820, a bias control circuit or block 825, one or more analog to digital converters (ADC) 855, a temperature control circuit or block 890, a transmitter optical subassembly (TOSA) 830, a receiver optical subassembly (ROSA) 870 and a plurality of limiting amplifiers 880. The TOSA 830 generally comprises a plurality of monitoring photodiodes (MPDs) 836, a plurality of lasers or laser diodes (LDs) 832, an optional corresponding plurality of modulators 834, and an optical multiplexer 840. The ROSA 870 may include an optical demultiplexer 860, a plurality of photodiodes (PDs) 872, and optionally one or more transimpedance amplifiers (TIAs) 874.

The electrical signal TX is received by the electrical interface 810. The optical signal OUT may be generated by the TOSA 830. The data signals in the signal TX pass through the electrical interface 810 to the laser drivers 820. Bias control information from the MCU 850 is received by the bias control circuit 825. The bias control information may be used to control biasing in the generation of individual optical signals. The MPDs 836 may generate analog feedback signals and convey the feedback signals to the ADCs 855. Digital feedback information may be received by the MCU 850 from the ADCs 855. The feedback information provides the MCU 850 with signal strength information of the individual optical signals to enable the MCU 850 to control an amplitude of the individual optical signals.

A control signal (e.g., a driving voltage) may be generated by the MCU 850 and presented to the laser drivers 820.

In the transmitter path of the optical transceiver 800, the laser drivers 820 may receive electrical data signals from the host 72 through the electrical interface 810 and send data driving signals or pulses to the modulators 834. Alternatively, the LDs 832 may receive the data driving signals or pulses directly from the laser drivers 820, in which case the modulators 834 may be eliminated. The electrical interface 810 may comprise, for example, a conventional golden finger connector and a plurality of traces and/or pads on a circuit board (not shown). The circuit board may include one or more discrete capacitors and/or resistors electrically connected to one or more of the traces. The LDs 832 may receive the bias signal or voltage from the bias control circuit 825. The MPDs 836 are generally connected to the MCU 850 via the ADCs 855. Thus, the MCU 850 may receive a digital signal (e.g., a voltage) corresponding to the value of a feedback current from each of the MPDs 836. The feedback currents may be compared to one or more thresholds or voltages representative of a target and/or maximum value of the operating range of the laser driver circuits 820. The MPD circuits 836, the ADCs 855, the MCU 850 and the laser drivers 820 may form a closed loop automatic power control (APC) regulating loop for maintaining a target optical output power from the LDs 832.

The optical signal OUT may be output through the optical multiplexer 840. A temperature control signal may be received by the TOSA 830 from the temperature control circuit 890. A bias signal may be received by the LDs 832 from the bias control circuit 825. The bias signal may be used, in part, to power the LDs 832 and, in part, to adjust the temperature of the LDs 832. For example, the lower the bias to the LDs, the lower the temperature of the LDs will be. A plurality of driving signals may be received by the LDs 832 and/or the modulators 834 from the laser drivers 820. The driving signals may be used to modulate the individual optical signals generated by the LDs 832. Alternatively, in the absence of the modulators 834, the driving signals may drive the LDs 832 directly.

An optical input signal (e.g., IN) carrying incoming data may be received by the demultiplexer 860 from a network (e.g., over an optical fiber). The PDs 872 convert the optical signals to electrical signals, the TIAs 874 initially amplify the electrical signals from the PDs 872, and the limiting amplifiers 880 may amplify the electrical signals from the TIAs 874. Amplitude limited electrical data may be presented from the limiting amplifiers 880 to the electrical interface 810 for transmission to the host 72 (FIG. 1). The MCU 850 may provide control information (e.g., gain control signals, boost control signals, etc.) to the TIAs 874 and/or the PDs 872.

The MCU 850 generally controls the power of the data signals from the laser drivers 820 and the voltage or current of the bias signals provided by the bias control circuit 825. The MCU 850 may also control the temperature control circuit 890 that in turn controls the temperature of the LDs 832 (e.g., by thermoelectric cooling), and optionally, the temperature of the modulators 834. Generally, the temperature of the LDs 832 and the modulators 834 may be controlled at least in part by regulating the power supplied thereto (e.g., when the temperature of the LDs 832 is too high, the bias from the bias control circuit 825 may be reduced, and when the temperature of the LDs 832 is too low, the bias from the bias control circuit 825 may be increased).

In the receiver path of the optical transceiver 800, the optical demultiplexer 860 generally receives a multi-channel optical data signal IN. In various embodiments, the optical demultiplexer 860 may comprise a plurality of filters and a plurality of detectors, similar to the optical multiplexer 840, but in which the signal path(s) are reversed, and the individual optical signals are focused (e.g., by a lens) onto an individual PD 872. In some embodiments, the optical demultiplexer 860 may be implemented with a common design. Details of another implementation of the optical demultiplexer 870 may be found in U.S. Provisional Patent Application No. 62/402,578, filed Sep. 30, 2016, the relevant portions of which are incorporated herein by reference.

The PDs 872 generally receive the individual optical signals from the optical demultiplexer 860 and convert the individual optical signals into individual electrical signals. The individual electrical signals may be amplified by the TIAs 874. The amplified electrical signals from the TIAs 874 may be further amplified by the limiting amplifiers 880 prior to transmission through the electrical interface 810 (e.g., to the host 72).

The MCU 850 may control the gain(s) of the TIAs 874 and/or the limiting amplifiers 870. The MCU 850 may also control the temperature control circuit 890, which in turn controls the temperature of the PDs 872. In various embodiments, the transceiver 800 may further comprise a different and/or separate temperature control circuit to control the temperature of the PDs 872.

Referring to FIG. 3, a diagram of an exemplary implementation of the optical transmitter 74 is shown. The optical transmitter_74 generally comprises a housing 80 and the TOSA 100. The housing 80 may include an optical connector 78 and an electrical connector 82. The optical transmitter_74 may be connected to a gendered connector (e.g., a male connector) 77 configured to receive and/or secure an end of the transmission medium 76 via an opposite gendered connector (e.g., a female connector) 78. The optical signal OUT may be generated inside the housing 80 and passed through the optical connectors 77 and 78 into the optical transmission medium 76 (e.g., a fiber optic cable).

In various embodiments, the electrical connector 82 may be suitable for the electrical connector 810 in FIG. 2. The electrical connector 82 may be electrically coupled to the host 72 to receive the signal TX. In some embodiments, the electrical connector 82 comprises a plurality of conductive (e.g., metal) fingers and electrical traces therefrom to, for example, electrical and/or electrooptical components in the TOSA 100 (e.g., optical signal generators 140, 141, 142, 143, 150, 151, 152, and 153, laser drivers [not shown], etc.). In some applications, the fingers may comprise gold, silver, copper, aluminum, or gold, silver or copper plating on another metal (e.g., aluminum).

Within the TOSA 100, the optical signal generators 140-143 and 150-153 (each of which may comprise one of the modulators 834 and one of the LDs 832 of FIG. 2) may present a plurality of individual optical signals that are combined by an optical multiplexer 180 as described herein. The optical multiplexer 180 as illustrated may implement and/or comprise an N-channel optical multiplexer. In various embodiments, the number of channels N may be an integer of at least 4. While the number of channels N shown in FIG. 3 is 8 channels, other numbers of channels N (e.g., 4, 12, 16, etc.) may be implemented and/or included to meet the design criteria of a particular implementation.

The optical multiplexer 180 generally comprises a plurality of filters 220, 221, 222, 223, 230, 231, 232 and 233, a mirror 240, an optional optical isolator 242 and an optical submount 250 including first and second mirrors 252 and 254. In various embodiments, the TOSA 100 may further include a plurality of lenses 200, 201, 202 and 203 configured to focus the optical signals from the optical signal generators 140, 141, 142 and 143 onto locations on the filters 230, 231, 232 and 233, respectively, where the optical signals from the optical signal generators 150, 151, 152 and 153 pass through. The TOSA 100 may include another plurality of lenses 210, 211, 212 and 213 configured to focus the optical signals from the optical signal generators 150, 151 152 and 153 onto locations on the filters 220, 221, 222 and 223, respectively, where the optical signals from the optical generators 140, 141, 142 and 143 pass through. In various embodiments, the filter 230 may be optional or may comprise or be implemented as a wide bandpass filter.

The set of optical signal generators 140, 141, 142 and 143 may be aligned along their optical axes with the lenses 200, 201, 202 and 203, respectively. The other set of optical signal generators 150, 151, 152 and 153 may be aligned along their optical axes with the lenses 210, 211, 212 and 213, respectively. Each optical signal generator 140, 141, 142, 143, 150, 151, 152 and 153 may comprise a laser diode, a laser diode with a modulator, a laser diode with a modulator and a waveguide, or a light-emitting diode (LED). In some embodiments, the optical signal generators 140, 141, 142, 143, 150, 151, 152 and 153 may comprise a diffused feedback (DFB) laser, an electromodulated laser (EML), and the like. In various embodiments, the laser in the optical signal generators 140, 141, 142, 143, 150, 151, 152 and 153 may comprise an AlGaAs laser, an InGaAsP laser, an InGaAsN laser or an InGaAsNSb laser. The wavelength difference between adjacent optical signals from the optical signal generators 140, 141, 142, 143, 150, 151, 152 and 153 is generally ≥0.4 nm (e.g., ≥0.8 nm), although the invention is not necessarily limited thereto. The transmission band of each of the optical signals may be in the range of around 1200 nm to around 1550 nm.

Each lens 200, 201, 202, 203, 210, 211, 212 and 213 may focus the light from the respective optical signal generator 140, 141, 142, 143, 150, 151, 152 and 153 onto a respective target (e.g., an opposite filter where the next optical signal is passing through). Each lens 200, 201, 202, 203, 210, 211, 212 and 213 may also be in or secured by a holder that is easier to maneuver than the lens itself, facilitating placement and adjustment of the lens position.

As is shown in FIG. 3, the filters 220, 221, 222, 223, 230, 231, 232 and 233 generally combine multiple (e.g., 8) individual optical signals to create a multi-channel (e.g., 8-channel) optical signal (e.g., the signal OUT). The optical signal OUT may be directed by the mirror 240 through the optical isolator 242 to the optical submount or shifting block 250.

Each filter 220, 221, 222, 223, 230, 231, 232 and 233 generally comprises a separate component with unique optical properties, and is adhered to or fixed in predetermined places or locations within the optical multiplexer 180. The filters 220, 221, 222 and 223 may be arranged in parallel or in line with each other. The filters 230, 231, 232 and 233 may be arranged in parallel or in line with each other. A row containing the filters 220, 221, 222 and 223 may be parallel to another row containing the filters 230, 231, 232 and 233. The filters 220, 221, 222, 223, 230, 231, 232 and 233 may implement or comprise wavelength-selective filters and/or polarization filters. In some embodiments, each filter 220, 221, 222, 223, 230, 231, 232 and/or 233 may be designed to pass only optical signals having a particular polarization type (e.g., s-polarization or p-polarization). Each filter 220, 221, 222, 223, 230, 231, 232 and/or 233 may be polarization-dependent (e.g., reflect light having a first polarization type and allows light having a second, different polarization type to pass through) and/or comprise a highpass filter, a lowpass filter, or a bandpass filter. In various embodiments, the filter 230 may be optional or implemented as a wide bandpass filter (e.g., transparent).

The mirror 240 may be a non-selective or total reflectance minor. The optical isolator 242 generally comprises, but is not limited to, a first half-wave plate (e.g., input polarizer), a Faraday rotator and a second half-wave plate (e.g., an output polarizer). Other layers and additional structures (e.g., one or more magnets) may be added and/or implemented to meet the design criteria of a particular application.

The optical submount 250 may align the final or last multi-channel optical signal (e.g., the signal OUT) with the transmission medium 76. As illustrated, the optical submount 250 may include a pair of minors 252 and 254 aligned to reflect the optical signal OUT from near an outside edge of the optical multiplexer 180 to a center of the transmission medium in the connector 77.

The optical transmitter 74 also includes a thermoelectric cooler (TEC) 92 configured to control the temperature of various components in the TOSA 100. For example, as the temperature of the optical signal generators 140, 141, 142, 143, 150, 151, 152 and 153 increases, the properties of the generated optical signals may vary. As a result, the TEC 92 can be used to cool the optical signal generators 140, 141, 142, 143, 150, 151, 152 and 153 and maintain constant or substantially constant optical signal properties. By distributing the optical signal generators 140, 141, 142, 143, 150, 151, 152 and 153 across two dimensions of the TEC 92 (e.g., on opposite sides of the optical multiplexer 180), the TEC can cool the optical signal generators 140, 141, 142, 143, 150, 151, 152 and 153 more efficiently and maintain constant or substantially constant optical signal properties more effectively.

Figure 4:
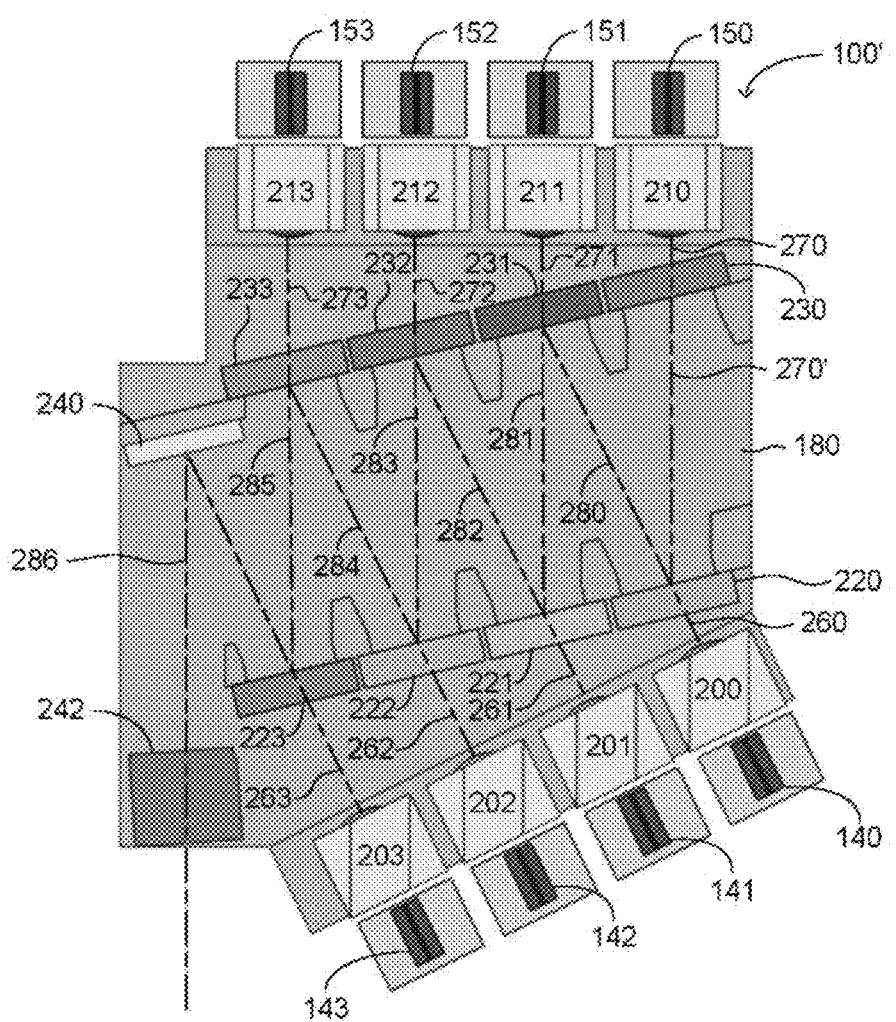
FIG. 4 is a diagram showing a portion of an exemplary 8-channel optical transmitter in accordance with embodiments of the invention.

Referring to FIG. 4, a diagram of an exemplary portion of an 8-channel optical transmitter 100' is shown. The optical transmitter 100' may include the optical transmitter 100 of FIG. 1, or a variation of the optical transmitter 100. The optical transmitter 100' generally comprises the plurality of laser diodes 140, 141, 142, 143, 150, 151, 152 and 153, the plurality of lenses 200, 201, 202, 203, 210, 211, 212 and 213, the plurality of filters 220, 221, 222, 223, 230, 231, 232 and 233, the mirror 240 and the optical isolator 242. A plurality of individual or single-channel optical signals 260, 261, 262 and 263 may be incident on the filters 220, 221, 222 and 223, respectively. A plurality of individual or single-channel optical signals 270, 271, 272 and 273 may be incident on the filters 230, 231, 232 and 233, respectively. A plurality of multi-channel optical signals 280, 281, 282, 283, 284, 285 and 286 travel between the filters 220, 221, 222, 223, 230, 231, 232 and 233 and the minor 240. A final or last multi-channel optical signal (e.g., optical signal 286) may pass through the optical isolator 242. In addition, the optical transmitter 100' may include additional components in various optical paths, such as one or more additional lenses, bandpass and/or polarization filters and/or mirrors. In various embodiments, the filter 230 may be optional or may comprise a wide bandpass filter.

Some of the optical signals 260, 261, 262 and 263 from respective optical signal generators (e.g., laser diodes) 140, 141, 142 and 143 generally pass through corresponding ones of the plurality of lenses 200, 201, 202 and 203 and corresponding ones of the filters 220, 221, 222 and 223.

Some of the optical signals 270, 271, 272 and 273 from respective optical signal generators (e.g., laser diodes) 150, 151, 152 and 153 generally pass through corresponding ones of the plurality of lenses 210, 211, 212 and 213 and corresponding ones of the filters 230, 231, 232 and 233. The individual optical signals 260, 261, 262, 263, 270, 271, 272 and 273 generally have different wavelengths, and in some instances, different polarization types. For example, the optical signals 260, 261, 262 and 263 may have a polarization type (e.g., s-polarization) and the optical signals 270, 271, 272 and 273 may have another polarization type (e.g., p-polarization).

The optical signal 270 may pass through the filter 230, if implemented or included, and continue to the filter 220. The optical signal 260 may pass through the filter 220 at a position or location where the optical signal 270 reflects from the filter 220. A combination of the passed optical signal 260 and the reflected optical signal 270 may form the multi-channel (e.g., 2-channel) optical signals 280. The multi-channel optical signals 280 may be aligned to a center of the filter 231.

The optical signal 271 may pass through the filter 231 at a position or location where the multi-channel optical signal 280 reflects from the filter 231. A combination of the passed optical signal 271 and the reflected multi-channel optical signal 280 may form another multi-channel (e.g., 3-channel) optical signals 281. The multi-channel optical signal 281 may be aligned to a center of the filter 221.

The optical signal 261 may pass through the filter 221 at a position or location where the multi-channel optical signal 281 reflects from the filter 221. A combination of the passed optical signal 261 and the reflected multi-channel optical signal 281 may form another multi-channel (e.g., 4-channel) optical signals 282. The multi-channel optical signal 282 may be aligned to a center of the filter 232.

The optical signal 272 may pass through the filter 232 at a position or location where the multi-channel optical signal 282 reflects from the filter 232. A combination of the passed optical signal 272 and the reflected multi-channel optical signal 282 may form another multi-channel (e.g., 5-channel) optical signals 283. The multi-channel optical signal 283 may be aligned to a center of the filter 222.

The optical signal 262 may pass through the filter 222 at a position or location where the multi-channel optical signal 283 reflects from the filter 222. A combination of the passed optical signal 262 and the reflected multi-channel optical signal 283 may form another multi-channel (e.g., 6-channel) optical signals 284. The multi-channel optical signal 284 may be aligned to a center of the filter 233.

The optical signal 273 may pass through the filter 233 at a position or location where the multi-channel optical signal 284 reflects from the filter 233. A combination of the passed optical signal 273 and the reflected multi-channel optical signal 284 may form another multi-channel (e.g., 7-channel) optical signals 285. The multi-channel optical signal 285 may be aligned to a center of the filter 223.

The optical signal 263 may pass through the filter 223 at a position or location where the multi-channel optical signal 285 reflects from the filter 223. A combination of the passed optical signal 263 and the reflected multi-channel optical signal 285 may form another multi-channel (e.g., 8-channel) optical signals 286. The multi-channel optical signal 286 may be aligned to a center of the mirror 240. The mirror 240 may direct the multi-channel optical signal 286 to the optical isolator 242, if implemented or included. Once through the optical isolator 242, the multi-channel optical signals 286 may proceed to the optical submount 250 and out to the transmission medium 76.

As shown in FIG. 4, by using facing rows of lasers 140, 141, 142, 143, 150, 151, 152 and 153 to generate the individual optical signals 220, 221, 222, 223, 230, 231, 232 and 233, a geometric error (e.g., in optical signal alignment) may be less over all of the optical channels in the optical signal 286 compared to a common optical multiplexer that generates all eight individual optical signals in a single row in a single direction. The overall length of the 8-channel optical multiplexer 180 and/or 840 is about the same as corresponding common 4-channel designs. Furthermore, a difference in a minimum optical path and a maximum optical path (e.g., a skew between the shortest optical path and a longest optical signal path) is about the same as corresponding common 8-channel designs.

The optical multiplexer 180 and/or 840 may include additional components in various optical paths, such as one or more additional lenses and/or additional bandpass and/or polarization filters. The additional lens(es) may be, for example, in the optical path of the 8-channel optical signal 286 after the minor 240. Furthermore, depending on the space in the housing 80 of the optical transmitter 100', the optical transmitter 100' and/or the optical multiplexer 180/840 may include one or more simple (e.g., non-selective) mirrors in the optical path between the optical signal generators 140, 141, 142, 143, 150, 151, 152 and 153 and the lenses 200, 201, 202, 203, 210, 211, 212 and 213.

Exemplary Optical Multiplexers

Figure 5:
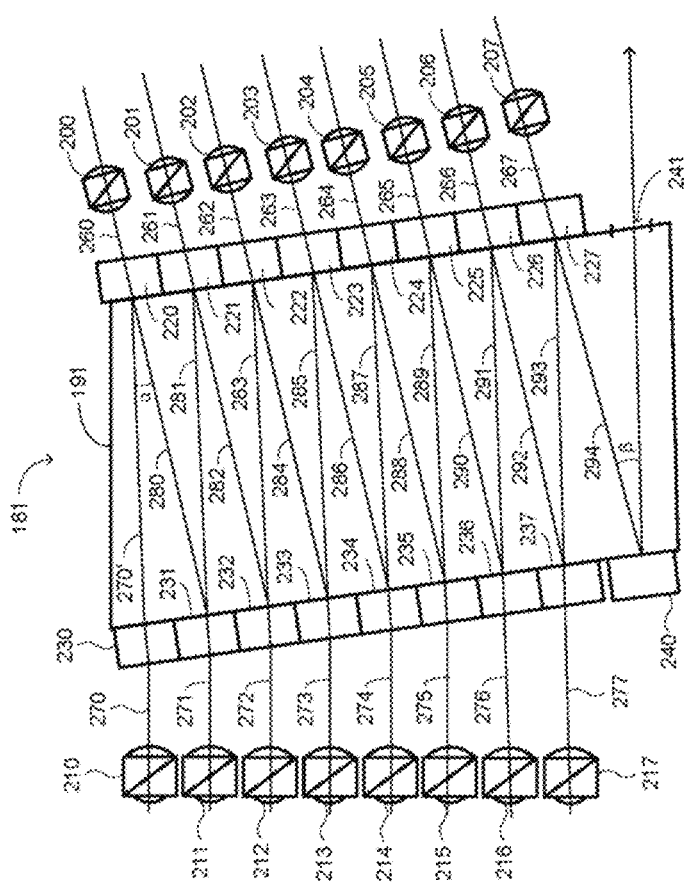
FIG. 5 is a diagram showing an exemplary 16-channel optical multiplexer in accordance with one or more embodiments of the invention.

Referring to FIG. 5, a diagram of an exemplary 16-channel optical multiplexer 181 is shown. The 8-channel optical multiplexer designs shown in FIGS. 3 and 4 may be extended to higher-bandwidth applications (e.g., more than 8 channels) in which the error or skew across more than eight multiplexed signals is unacceptable. The optical multiplexer 181 generally comprises a structural block 191, the plurality of lenses 200, 201, 202, 203, 204, 205, 206, 207, 210, 211, 212, 213, 214, 215, 216 and 217, the plurality of filters 220, 221, 222, 223, 224, 225, 226, 227, 230, 231, 232, 233, 234, 235, 236 and 237, the minor 240 and a port 241. The plurality of optical signals 260, 261, 262, 263, 264, 265, 266 and 267 may be incident on the filters 210, 211, 212, 213, 214, 215, 216 and 217. The plurality of optical signals 270, 271, 272, 273, 274, 275, 276 and 277 may be incident on the filters 230, 231, 232, 233, 234, 235, 236 and 237. The optical multiplexer 181 may have substantially the same advantages as the optical multiplexers 180 in FIGS. 3 and 4 (e.g., the geometric error or signal spreading does not accumulate over all of the channels in the last multi-channel optical signal, the overall length is about half as common 16-channel designs, the difference in minimum and maximum optical path lengths about half of the common 16-channel design, etc.). In addition, the optical multiplexer 181 may include additional components in various optical paths, such as one or more additional lenses, bandpass and/or polarization filters and/or minors. The individual optical signals may have different wavelengths and may have the same or different polarization types. In an example, each of the optical signals may have the same polarization type (e.g., s-polarization or p-polarization). In various embodiments, the filter 230 may be optional or may comprise a wide bandpass filter.

The structural block 191 may comprise and/or be implemented as an optically transparent block. The structural block 191 may be generally shaped as a parallelogram with the filters 220, 221, 222, 223, 224, 225, 226 and 227 mounted on a side and the filters 230, 231, 232, 233, 234, 235, 236 and 237 mounted on an opposing side. In some embodiments, the structural block 191 may be tapered such that a separation between the filter 220 and the filter 230 is different than a separation between the filter 227 and the filter 237. The placement of the filters 220, 221, 222, 223, 224, 225, 226, 227, 230, 231, 232, 233, 234, 235, 236 and 237, the lenses 200, 201, 202, 203, 204, 205, 206, 207, 210, 211, 212, 213, 214, 215, 216 and 217, and the LDs 140, 141, 142, 143, 144, 145, 146, 147, 150, 151, 152, 153, 154, 155, 156 and 157 on both sides of the structure block 191 generally reduces both the length and the width dimensions of the multiplexer 181, without affecting the reliability of the optical transmitter 100 or 100' including the optical multiplexer 181.

The filters 224, 225, 226, 227, 234, 235, 236 and 237 may be similar in nature to the filters 220, 221, 222, 223, 230, 231, 232 and 233 and may include wavelength-selective filters and/or polarization filters. Each filter 220, 221, 222, 223, 224, 225, 226, 227 230, 231, 232, 233, 234, 235, 236 and 237 generally comprises a separate component with unique optical properties and adhered or fixed onto one of the opposing surfaces of the structural block 191, or may be a coating applied to the opposing surfaces of the structural block 191.

Operation of the optical multiplexer 181 may be similar to the operation of the optical multiplexer 180. The individual optical signals 260, 261, 262, 263, 264, 265, 266 and 267 may pass through the filters 220, 221, 222, 223, 224, 225, 226 and 227. The individual optical signals 270, 271, 272, 273, 274, 275, 276 and 277 may through the filter 230, 231, 232, 233, 234, 235, 236 and 237. Inside the structural block 191, the optical signal 270 may be pass through the filter 230 to the spot or location on the filter 220 where the optical signal 260 passes through the filter 220. The optical signal 270 may be reflected by the filter 220 at an angle (e.g., $\alpha$) such that the two optical signals 270 and 260 have the same optical path, thereby forming a combined signal 280. The angle $\alpha$ may range from approximately 5° to approximately 40°. Other angles may be utilized to meet the design criteria of a particular application.

The combined signal 280 may be directed to the spot or location on the filter 231 where the optical signal 271 passes through the filter 231. The combined signal 280 may be reflected by the filter 231 at an angle such that the three optical signals (i.e., the two optical signals in the combined signal 280 and the optical signal 271) have the same optical path, thereby forming another combined signal 281. The combined signal 281 may be directed to the spot or location on the filter 221 where the optical signal 261 passes through the filter 221. The combined signal 281 is reflected by the filter 221 at an angle such that the four optical signals (i.e., the three optical signals in the combined signal 281 and the optical signal 261) have the same optical path, thereby forming a 4-channel optical signal 282. The process of reflecting the multi-channel optical signals 282, 283, 284, 285, 286, 287, 288, 289, 290, 291, 292 and 293 and combining the reflected multi-channel optical signals with individual optical signals 262, 263, 264, 265, 266, 267, 272, 273, 274, 275, 276 and 277 may continue until the last or final multi-channel optical signal 294 is created. The mirror 240 may reflect the multi-channel optical signal 294 toward the port 241 (e.g., a transparent area or opening) in the structural block 191.

The tapering and/or index of refraction of the structural block 191 may cause the angles of reflection to vary along a major axis of the structural block 191. While the optical signals 270 and 280 may be separated by the angle α, the optical signals 293 and 294 may be separated by another angle (e.g., β). The angle β is generally the same as α (e.g., it may range from 5° to 40°. However, other angles (e.g., larger angles) may be implemented or utilized to meet the design criteria of a particular application. Alternatively, mirror 240 may be omitted, and the last multi-channel optical signal 294 may be directed towards the optical transmission medium by optics placed at least in part proximate to lens 217 and the corresponding optical signal generator (not shown).

As shown in FIG. 5, by using opposing sides of the structural block 191 to receive the individual optical signals, a geometric error (e.g., in optical signal alignment) may be less over all of the channels in the multi-channel optical signal 294 compared to a common optical multiplexer that received the 16 individual optical signals on a single side. The overall length of the 16-channel optical multiplexer 181 is about the same as the corresponding common 8-channel design. Furthermore, a difference in a minimum optical path and a maximum optical path (e.g., a skew between a shortest optical path and a longest optical signal path) may be about the same as the corresponding common 8-channel designs.

Figure 6:
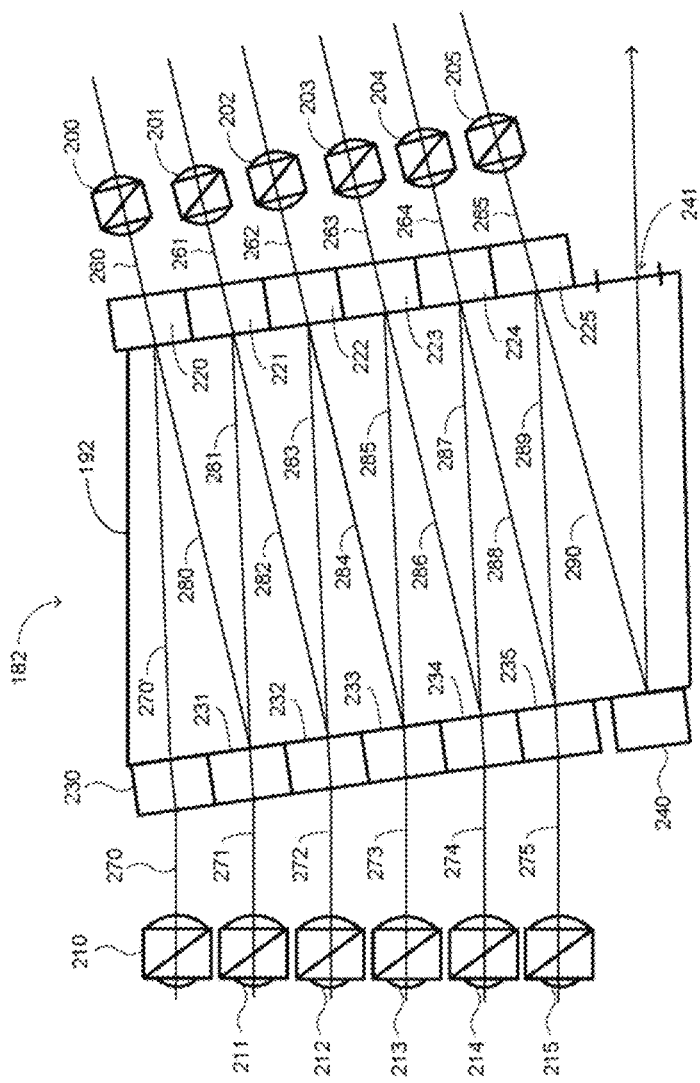
FIG. 6 is a diagram showing an exemplary 12-channel optical multiplexer in accordance with one or more embodiments of the invention.

Referring to FIG. 6, a diagram of an exemplary 12-channel optical multiplexer 182 is shown. The optical multiplexer 182 may be a variation of the optical multiplexers 840, 180 and/or 181. The optical multiplexer 182 generally comprises a structural block 192, the plurality of lenses 200, 201, 202, 203, 204, 205, 210, 211, 212, 213, 214 and 215, the plurality of filters 220, 221, 222, 223, 224, 225, 230, 231, 232, 233, 234 and 235, the mirror 240 and the port 241. The plurality of optical signals 260, 261, 262, 263, 264 and 265 may be incident on the filters 210, 211, 212, 213, 214 and 215. The plurality of optical signals 270, 271, 272, 273, 274 and 275 may be incident on the filters 230, 231, 232, 233, 234 and 235. The structural block 192 may be a shorter version of the structural block 191. The optical multiplexer 182 may have substantially the same advantages as the optical multiplexers 180 and 181 (e.g., the geometric error or signal spreading does not accumulate over all of the channels in the last multi-channel optical signal, the overall length is about half as common 12-channel designs, the difference in minimum and maximum optical path lengths about half of the common 12-channel design, etc.). In addition, the optical multiplexer 182 may include additional components in various optical paths, such as one or more additional lenses, bandpass and/or polarization filters and/or mirrors. The individual optical signals may have different wavelengths and may have the same or different polarization types. In an example, each of the optical signals may have the same polarization type (e.g., s-polarization or p-polarization). In various embodiments, the filter 230 may be optional or may comprise a wide bandpass filter.

Operation of the optical multiplexer 182 may be similar to the operation of the optical multiplexers 180 and/or 181. The individual optical signals 260, 261, 262, 263, 264 and 265 may pass through the filters 220, 221, 222, 223, 224 and 225. The individual optical signals 270, 271, 272, 273, 274 and 275 may through the filter 230, 231, 232, 233, 234 and 235. Inside the structural block 192, the optical signal 270 may be pass through the filter 230 to the spot or location on the filter 220 where the optical signal 260 passes through the filter 220. The optical signal 270 may be reflected by the filter 220 at an angle such that the two optical signals 270 and 260 have the same optical path, thereby forming a combined signal 280.

The combined signal 280 may be directed to the spot or location on the filter 231 where the optical signal 271 passes through the filter 231. The combined signal 280 may be reflected by the filter 231 at an angle such that the three optical signals (i.e., the two optical signals in the combined signal 280 and the optical signal 271) have the same optical path, thereby forming another combined signal 281. The combined signal 281 may be directed to the spot or location on the filter 221 where the optical signal 261 passes through the filter 221. The combined signal 281 is reflected by the filter 221 at an angle such that the four optical signals (i.e., the three optical signals in the combined signal 281 and the optical signal 261) have the same optical path, thereby forming a 4-channel optical signal 282. The process of reflecting the multi-channel optical signals 282, 283, 284, 285, 286, 287, 288 and 289 and combining the reflected optical signals with individual optical signals 262, 263, 264, 265, 272, 273, 274 and 275 may continue until the last or final multi-channel optical signal 290 is created. The mirror 240 may reflect the multi-channel optical signal 290 toward the port 241 (e.g., a transparent area or opening) in the structural block 192.

As shown in FIG. 6, by using opposing sides of the structural block 192 to receive the individual optical signals, a geometric error (e.g., in optical signal alignment) may be less over all of the channels in the multi-channel optical signal 290 compared to a common optical multiplexer that received the 12 individual optical signals on a single side. The overall length of the 12-channel optical multiplexer 182 is about the same as the corresponding common 6-channel design. Furthermore, a difference in a minimum optical path and a maximum optical path (e.g., a skew between a shortest optical path and a longest optical signal path) is about the same as the corresponding common 6-channel designs.

Figure 7:
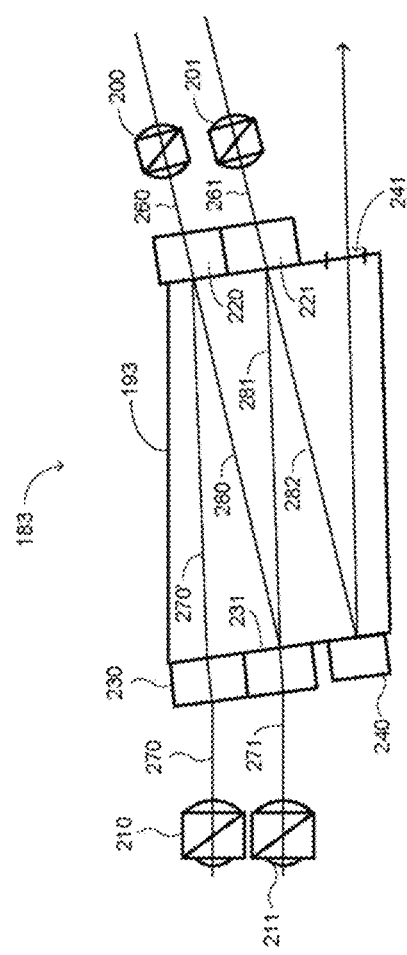
FIG. 7 is a diagram showing an exemplary 4-channel optical multiplexer in accordance with one or more embodiments of the invention.

Referring to FIG. 7, a diagram of an exemplary 4-channel optical multiplexer 183 is shown. The optical multiplexer 183 may be a variation of the optical multiplexers 840, 180, 181 and/or 182. The optical multiplexer 183 generally comprises a structural block 193, the plurality of lenses 200, 201, 210 and 211, the plurality of filters 220, 221, 230 and 231, the minor 240 and a port 241. The plurality of optical signals 260 and 261 may be incident on the filters 210 and 211. The plurality of optical signals 270 and 271 may be incident on the filters 230 and 231. The structural block 193 may be a shorter version of the structural blocks 191 and 192. The optical multiplexer 183 may have substantially the same advantages as the optical multiplexers 180, 181 and 182 (e.g., the geometric error or signal spreading does not accumulate over all of the channels in the last multi-channel optical signal, the overall length is about half as common 4-channel designs, the difference in minimum and maximum optical path lengths about half of the common 4-channel design, etc.). In addition, the optical multiplexer 183 may include additional components in various optical paths, such as one or more additional lenses, bandpass and/or polarization filters and/or mirrors. The individual optical signals may have different wavelengths and may have the same or different polarization types. In an example, each of the optical signals may have the same polarization type (e.g., s-polarization or p-polarization). In various embodiments, the filter 230 may be optional or implemented may comprise a wide bandpass filter.

Operation of the optical multiplexer 183 may be similar to the operation of the optical multiplexers 181, 181 and/or 182. The individual optical signals 260 and 261 may pass through the filters 220 and 221. The individual optical signals 270 and 271 may through the filter 230 and 230.

Inside the structural block 193, the optical signal 270 may be pass through the filter 230 to the spot or location on the filter 220 where the optical signal 260 passes through the filter 220. The optical signal 270 may be reflected by the filter 220 at an angle such that the two optical signals 270 and 260 have the same optical path, thereby forming a combined signal 280.

The combined signal 280 may be directed to the spot or location on the filter 231 where the optical signal 271 passes through the filter 231. The combined signal 280 may be reflected by the filter 231 at an angle such that the three optical signals (i.e., the two optical signals in the combined signal 280 and the optical signal 271) have the same optical path, thereby forming another combined signal 281. The combined signal 281 may be directed to the spot or location on the filter 221 where the optical signal 261 passes through the filter 221. The combined signal 281 is reflected by the filter 221 at an angle such that the four optical signals (i.e., the three optical signals in the combined signal 281 and the optical signal 261) have the same optical path, thereby forming a 4-channel optical signal 282. The minor 240 may reflect the multi-channel optical signal 282 toward the port 241 (e.g., a transparent area or opening) in the structural block 193.

As shown in FIG. 7, by using opposing sides of the structural block 193 to receive the individual optical signals, a geometric error (e.g., in optical signal alignment) may be less over all of the channels in the multi-channel optical signal 282 compared to a common optical multiplexer that received the 4 individual optical signals on a single side. The overall length of the 4-channel optical multiplexer 183 is about the same as the corresponding common 2-channel design. Furthermore, a difference in a minimum optical path and a maximum optical path (e.g., a skew between a shortest optical path and a longest optical signal path) is about the same as the corresponding common 2-channel designs.

Figure 8:
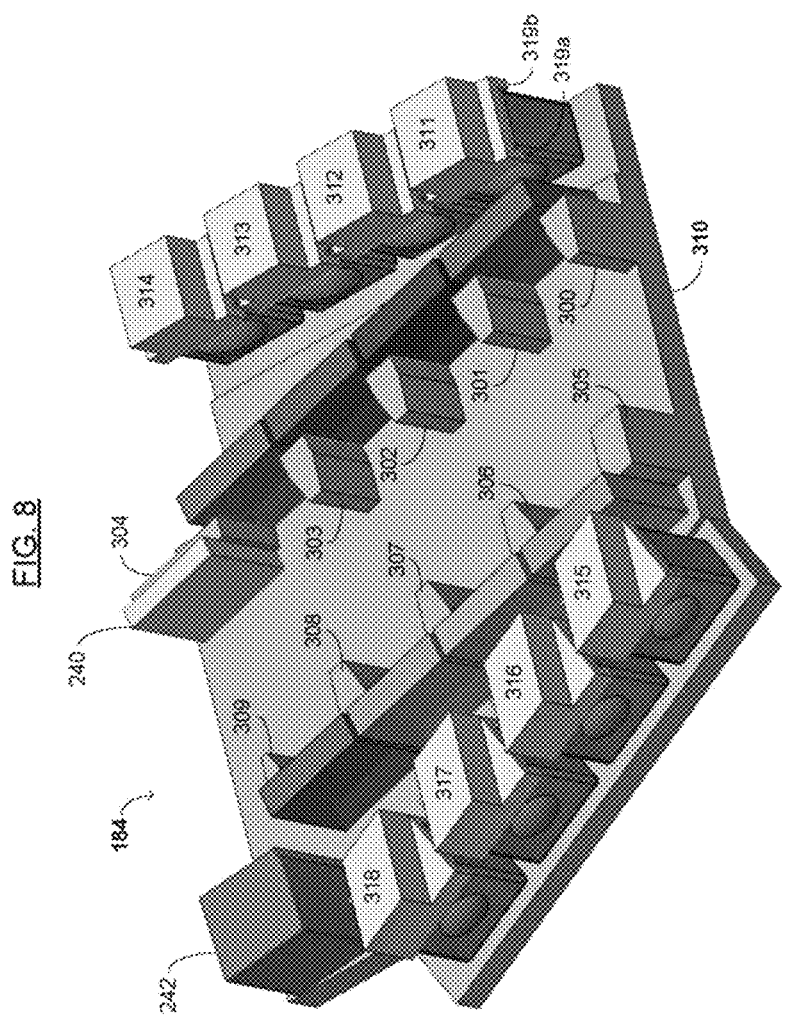
FIG. 8 is an isometric diagram showing an exemplary 8-channel optical multiplexer in accordance with one or more embodiments of the invention.

Referring to FIG. 8, an isometric diagram of an exemplary 8-channel optical multiplexer 184 is shown. The optical multiplexer 184 may be the same as or a variation of the optical multiplexers 840 and/or 180. The optical multiplexer 184 generally comprises the plurality of lenses 200, 201, 202, 203, 210, 211, 212 and 213, the plurality of filters 220, 221, 222, 223, 230, 231, 232 and 233, the mirror 240, the optical isolator 242, a plurality of posts or supports 300, 301, 302, 303, 304, 305, 306, 307, 308 and 309, a substrate or base 310 and a plurality of lens holders 311, 312, 313, 314, 315, 316, 317 and 318.

The posts 300, 301, 302, 303, 304, 305, 306, 307, 308 and 309 may be mounted to or formed as part of the substrate 310. The posts 300, 301, 302, 303 and 304 may be shaped to support the filters 230, 231, 232 and 233. The posts 305, 306, 307, 308 and 309 may be shaped to support the filters 220, 221, 222 and 223. The post 304 may also be shaped to support the mirror 240. The optical isolator 242 may be mounted on the base 310.

The lens holders 311, 312, 313, 314, 315, 316, 317 and 318 may be attached to a side of the lenses 200, 201, 202, 203, 210, 211, 212 and 213 opposite the substrate 310. Each lens holder 311, 312, 313, 314, 315, 316, 317 and 318 may include ridges or flanges 319a and 319b that help grip and control the lenses 200, 201, 202, 203, 210, 211, 212 and 213. Each lens holder 311, 312, 313, 314, 315, 316, 317 and 318 may provide a mechanical tab or handle suitable for holding, positioning and adjusting the corresponding lenses 200, 201, 202, 203, 210, 211, 212 and 213.

Exemplary Beam Shifting

Figure 9:
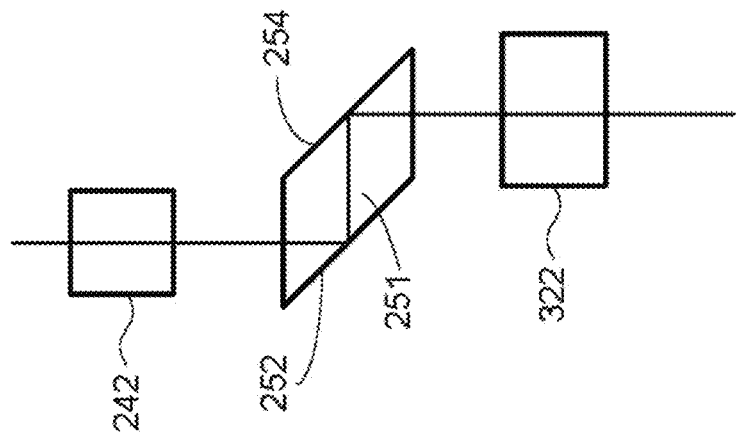
FIG. 9 is a diagram showing exemplary passive optical components in accordance with one or more embodiments of the invention.

Referring to FIG. 9, a diagram of an exemplary implementation of the optical submount 251 is shown. The optical submount 251 may be a variation of the optical submount 250. The optical submount 251 generally comprises a transparent parallelogram block. An index of refraction of the parallelogram block may be established such that the optical signal OUT (e.g., the signal 282, 286, 290 or 294) passes through a set of opposing ends of the optical submount 251 and is internally reflected from a set of opposing sides of the optical submount 251. The opposing sides may act as the mirrors 252 and 254. The optical submount 251 may physically shift or move the optical signal OUT from a position of the optical isolator 242 (or the port 241) to a lens 322 centered on the transmission medium 76.

Figure 10:
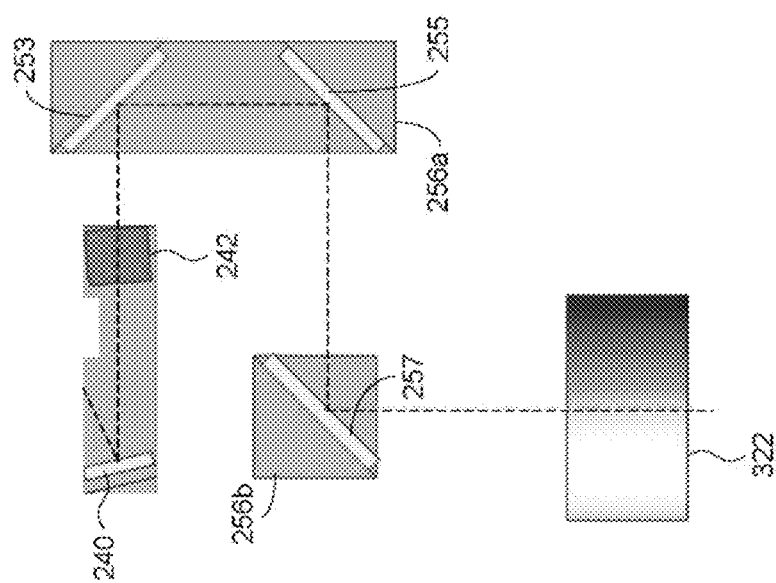
FIG. 10 is a diagram showing alternative exemplary passive optical components in accordance with one or more embodiments of the invention.

Referring to FIG. 10, a diagram of an exemplary implementation of another optical submount is shown. The optical submount may be a variation of the optical submounts 250 and/or 251. In various embodiments, the optical submount may be used in place of the optical submounts 250 and 251.

The optical submount generally comprises multiple (e.g., three) mirrors 253, 255 and 257 in one or more blocks 256a and 256b (two shown). The mirrors 253, 255 and 257 may physically shift or move the optical signal OUT from a position of the optical isolator 242 (or the port 241) to the lens 322 centered on the transmission medium 76. As illustrated, the optical submount may enable the optical isolator 242 to be oriented 90° out of alignment with the lens 322.

Figure 11:
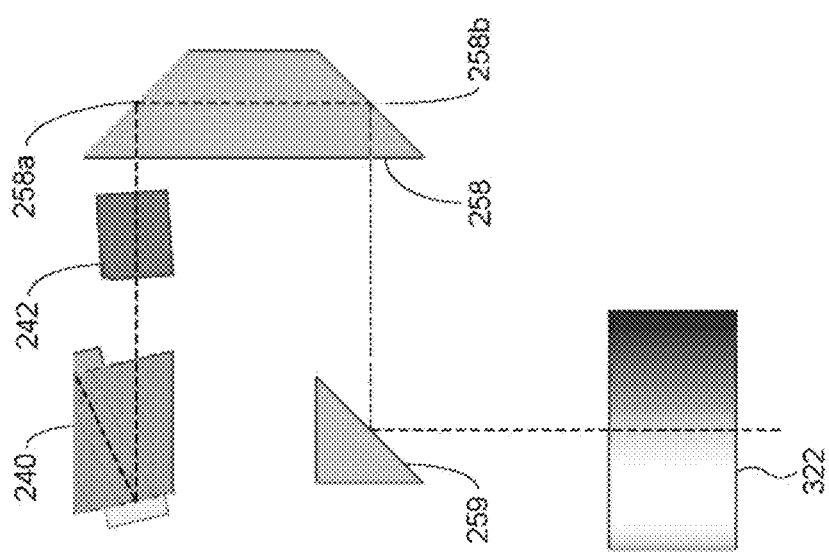
FIG. 11 a diagram showing still other exemplary passive optical components in accordance with one or more embodiments of the invention.

Referring to FIG. 11, a diagram of an exemplary implementation of still another optical submount is shown. The optical submount may be a variation of the other optical submounts shown in FIGS. 3, 9 and 10. In various embodiments, the optical submount shown in FIG. 11 may be used in place of the other optical submounts.

The optical submount generally comprises a transparent trapezoidal block 258 and a prism 259. An index of refraction of the transparent trapezoidal block 258 may be established such that the optical signal OUT passes through one side of the trapezoidal block 258, bounces off both sides 258a and 258b of the trapezoidal block 258, and leaves the trapezoidal block 258 in the opposite direction from which it entered. The signal OUT may subsequently bounce off a front surface of the prism 259 toward the lens 322. The optical submount may physically shift or move the optical signal OUT from a position of the optical isolator 242 (or the port 241) to the lens 322 centered on the transmission medium 76. As illustrated, the optical submount may enable the optical isolator 242 to be oriented 90° out of alignment with the lens 322.

An Exemplary Method of Operation

Figure 12:
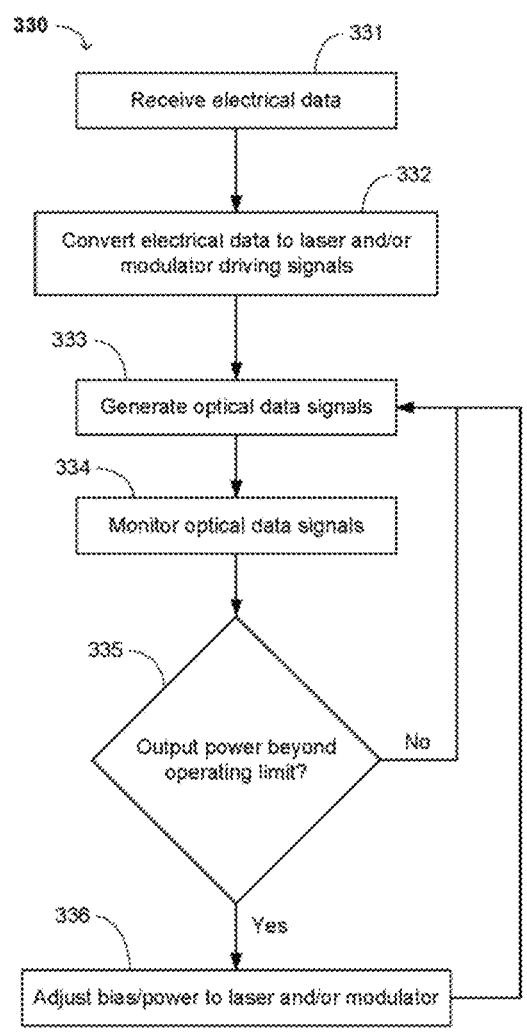
FIG. 12 is a flow diagram showing an exemplary method of generating optical signals in accordance with embodiments of the invention.

Referring to FIG. 12, a flow diagram of an exemplary implementation of a method 330 of generating the optical signals is shown. The method (or process) 330 may be performed by the optical transmitter 74.

At 331, the optical transmitter 74 may receive electrical data in digital form via the signal TX at the electrical interface 810 or 82. The laser drivers 820 may convert the electrical data to driving signals suitable to drive the LDs 832 and/or the modulators 834 at 332. At 333, the LDs 832 generally create the individual optical signals based on the driving signals and the bias control signals. The modulators 834 may modulate or adjust the individual optical signals at 333. Alternatively, the LDs 832 may generate the optical signals directly at 333.

At 334, the MPDs 836 generally monitor the optical data signals output by the optical signal generators and provide analog feedback signals based on the strength of the optical signals. The analog feedback signals may be converted to digital feedback signals by the ADCs 855 at 334. The digital feedback signals are generally received by the MCU 850. At 335, the MCU 850 may examine the output power levels of the LDs 832 based on the digital feedback signals received from the ADCs 855. If the output power signals are beyond operating limits (e.g., above an upper threshold or below a lower threshold), the MCU 850 may command the laser drivers 820 to adjust the driving signals accordingly at 336. After the driver signals have been adjusted at 336, or if the output power levels are within the operating limits at 335, the method 330 may return to the step 333 to continue generating optical signals in response to the electrical data received from the host 72.

Figure 13:
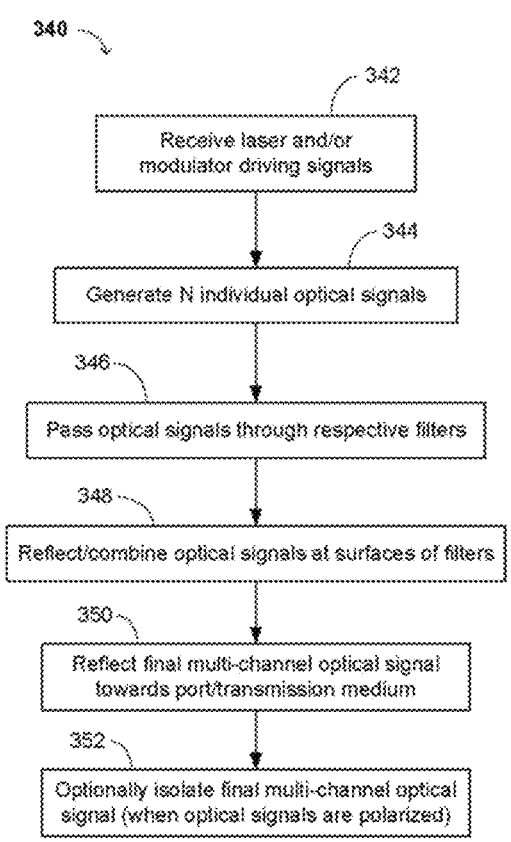
FIG. 13 is a flow diagram showing an exemplary method of multiplexing optical signals in accordance with one or more embodiments of the invention.

Referring to FIG. 13, a flow diagram of an exemplary implementation of a method 340 of optical multiplexing (e.g., combining optical signals) is shown. The method (or process) 340 may be performed in the TOSA 100 and/or the TOSA 100'.

At 342, the LDs 832 and/or the modulators 834 may receive the driving signals and/or modulation driving signals. The LDs 832 may generate N individual optical signals at 344. The value N may indicate an odd or even integer number of channels generally ranging from 4 to 16. Other numbers of channels may be implemented or utilized to meet the design criteria of a particular application. In embodiments that include the modulators 834, the modulators 834 may also modulate or adjust the N individual optical signals at 344.

The N individual optical signals generally pass through N respective filters (N−1 filters if the optional filter 230 is not included) at 346. After passing through the filters, each of the N individual optical signals except for the first optical signal (e.g., signal 270') may be combined with other (e.g., the preceding) optical signals reflected by the filters to form multi-channel optical signals at 348. A final multi-channel optical signal may be a combination of all N individual optical signals from an Nth filter.

By way of example, the individual optical signal 270' may be reflected by the filter 220 at 348. An angle of incidence and spatial location of the optical signal 270' at the filter 220 may be established such that the reflection of the optical signal 270' matches the transmitted optical signal 260. The reflection of the optical signal 270' may combine it with the optical signal 260 at the filter 220 to form a multi-channel (e.g., 2-channel) signal 280 at 348.

The multi-channel signal 280 may be reflected by the filter 231 at 348. An angle of incidence and spatial location of the multi-channel optical signal 280 at the filter 231 may be established such that the reflection of the multi-channel optical signal 280 matches the transmitted individual optical signal 271. The reflection of the multi-channel optical signal 280 may combine it with the optical signal 271 at the filter 231 to form another multi-channel (e.g., 3-channel) signal 281 at 348.

The multi-channel signal 281 may be reflected by the filter 221 at 348. An angle of incidence and spatial location of the multi-channel optical signal 281 at the filter 221 may be established such that the reflection of the multi-channel optical signal 281 matches the transmitted individual optical signal 262. The reflection of the multi-channel optical signal 281 may combine it with the optical signal 262 at the filter 221 to form another multi-channel (e.g., 4-channel) signal 282 at 348.

The multi-channel signal 282 may be reflected and combined at the filter 232 with the transmitted individual signal 272 at 348 to create another multi-channel (e.g., 5-channel) signal 283. The multi-channel signal 283 may be reflected and combined at the filter 222 with the transmitted individual signal 273 at 348 to create another multi-channel (e.g., 6-channel) signal 284. The multi-channel signal 284 may be reflected and combined at the filter 233 with the transmitted individual signal 273 at 348 to create another multi-channel (e.g., 7-channel) signal 285. The multi-channel signal 285 may be reflected and combined at the filter 223 with the transmitted individual signal 263 at 348 to create another multi-channel (e.g., 8-channel) signal 286.

In the step 350, the final or last multi-channel signal 286 may be reflected by the minor 240 towards the port 241 (and subsequently to one or more discrete optical components and/or the transmission medium 76). The port 241 may be spatially aligned with or in proximity of the discrete optical component(s) and/or the transmission medium 76. At 352, the multi-channel output signal 286 may pass through the optional optical isolator 242. In various embodiments, the optical isolator 242 may be included when one or more channels in the multi-channel optical signal 286 is polarized.

Figure 14:
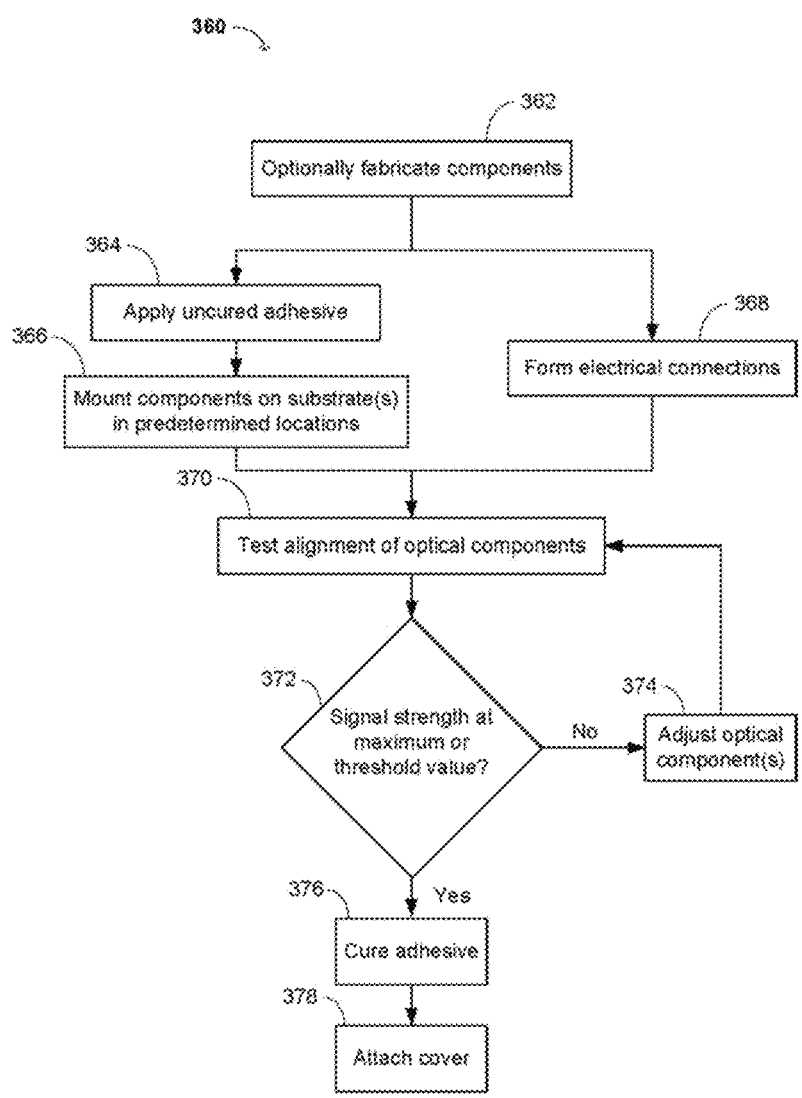
FIG. 14 is a flow diagram showing an exemplary method of fabricating the optical transceiver in accordance with embodiments of the invention.

Referring to FIG. 14, a flow diagram of a method 360 of fabricating the optical transmitter 74 is shown. The method (or process) 360 may be performed with common optoelectronic fabrication techniques and equipment. The method 360 may be explained with reference to FIGS. 2, 4, 5, 6, 7, 8, 9, 10 and 11.

If any of the various components (e.g., the electronic or electrooptical devices, filters, lenses, mirror[s], etc.) are not commercially available, they may be fabricated at 362. An uncured adhesive may be applied to predetermined locations on the substrate 310 where the components (e.g., the LDs 832, the modulators 834, the lenses 200, 201, 202, 203, 210, 211, 212 and 213, the filters 220, 221, 222, 223, 230, 231, 232 and 233, the structural blocks 191, 192 or 193, the minor 240, the optical isolator 242 and the optical submount) are to be located at 364. Alternatively or additionally, the uncured adhesive may be applied to one or more surfaces of the components that will contact the substrate and/or housing (e.g., in the TOSA optical cavity). The components may be mounted in the predetermined locations at 366. In a further embodiment of the method, a thermoelectric cooler (TEC) may be placed or mounted (with or without adhesive) in a location and/or position in the TOSA 100 enabling the TEC to control a temperature of the optical signal generators.

Electrical connections may be formed between the electrical connector 810/82 and the different electrical components (e.g., the MCU 850, the laser drivers 820, the bias control circuit 825, the ADCs 855, the temperature control circuit 890, the MPDs 836, the LDs 832 and the modulators 834) at 368. An optical sensor may be positioned at one or more locations along the various paths of the optical signals (e.g., at the location and/or in place of the optical transmission medium) to measure a strength of the optical signals. The LDs 832 and the modulators 834 may be powered and a signal detected by the optical sensor may be analyzed at 370 to test an alignment of the components.

If the strength of the optical signals being tested are below a maximum value or a threshold value at 372, the method 360 may continue to 374. One or more of the optical components may be adjusted at 374 and the testing repeated at 370 and analyzed at 372 until the signal strength is at or above the maximum value or the threshold value. The loop around testing at 370, analyzing the signal strength at 372 and adjusting the optical components at 374 may be repeated to adjust each of the optical components along the optical path until all of the optical components are aligned (e.g., a maximum or threshold signal strength is achieved or observed). At 376, the adhesive may be cured to secure the optical components in place. A cover may be attached to the housing 80 at 378 to seal the optical transmitter 74.

Figure 15:
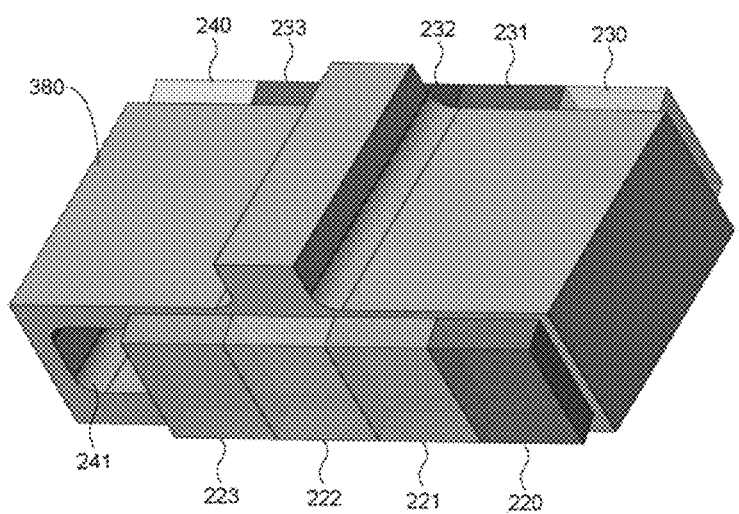
FIG. 15 is an isometric view showing a portion of the exemplary optical multiplexer of FIG. 3.

Referring to FIG. 15, an isometric view of an exemplary implementation of an alternative optical multiplexer 180 is shown. In some situations, the filters 220-223 and 230-233 and the mirror 240 may be fabricated, tested, adjusted and/or secured to the housing or submount 380 prior to placement or mounting of the optical multiplexer 180 in the TOSA 100 or 100' or in the housing 80 per the method 360 of FIG. 14. Similar to the method 360, assembly of the optical multiplexer 180 may include applying uncured adhesive at contact locations of the filters 220, 221, 222, 223, 230, 231, 232 and 233 and the mirror 240 on the housing or submount 380 (or vice versa). After placement or mounting of the optical multiplexer 180 in the TOSA 100 or 100', the optical components may be tested, the alignment adjusted, and the tests repeated until all of the optical components are properly aligned.

The functions and structures illustrated in the diagrams of FIGS. 1 to 15 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals, multi-chip modules, network adapters and/or network nodes. Those skilled in the relevant art(s) would understand that the elements of the invention may be implemented in other types of devices to meet the criteria of a particular application.

CONCLUSION/SUMMARY

Embodiments of the present invention advantageously provide a multi-channel optical transmitter and methods of making and using the same. The present optical multiplexer generally reduces an accumulation of the geometric error (e.g., in optical signal alignment) over the channels in the multi-channel optical signal presented from the optical multiplexer relative to the prior art. Furthermore, an overall length of the optical multiplexer is about the same as the corresponding design having half or fewer of the channels. Furthermore, the difference in the minimum optical path and the maximum optical path (e.g., the skew between the shortest and longest optical signal paths) is the same as the corresponding design having half or fewer of the channels.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical transmitter, comprising:
a first optical signal generator configured to transmit a first optical signal;
a second optical signal generator configured to transmit a second optical signal;
a first filter configured to combine the first optical signal with the second optical signal to form a first multi-channel optical signal;
a third optical signal generator configured to transmit a third optical signal;
a second filter configured to combine the third optical signal with the first multi-channel optical signal to form a second multi-channel optical signal;
a fourth optical signal generator configured to transmit a fourth optical signal;
a third filter configured to combine the fourth optical signal with the second multi-channel optical signal to form a third multi-channel optical signal;
a port configured to pass a last multi-channel optical signal to an optical transmission medium;
a thermoelectric cooler (TEC) configured to control a temperature of the first through fourth optical signal generators; and
a housing configured to enclose the optical signal generators, the filters and the TEC,
wherein the first optical signal and the third optical signal have parallel optical axes, the second optical signal and the fourth optical signal have parallel optical axes, and the second optical signal and the fourth optical signal are at an angle of from 5° to 40° with respect to the first optical signal and the third optical signal.

2. The optical transmitter of claim 1, wherein:
the first filter is configured to reflect the first optical signal and pass the second optical signal;

the second filter is configured to reflect the first multi-channel optical signal and pass the third optical signal; and the third filter is configured to reflect the second multi-channel optical signal and pass the fourth optical signal.

3. The optical transmitter of claim 1, wherein:

the first optical signal generator and the third optical signal generator respectively transmit the first and third optical signals in parallel prior to any reflection of the first optical signal or the third optical signal; and the second optical signal generator and the fourth optical signal generator respectively transmit the second and fourth optical signals in parallel prior to any reflection of the second optical signal or the fourth optical signal.

4. The optical transmitter of claim 1, further comprising:

a fifth optical signal generator configured to transmit a fifth optical signal;

a fourth filter configured to combine the fifth optical signal with the third multi-channel optical signal to form a fourth multi-channel optical signal;

a sixth optical signal generator configured to transmit a sixth optical signal; and a fifth filter configured to combine the sixth optical signal with the fourth multi-channel optical signal to form a fifth multi-channel optical signal.

5. The optical transmitter of claim 4, further comprising:

a seventh optical signal generator configured to transmit a seventh optical signal;

a sixth filter configured to combine the seventh optical signal with the fifth multi-channel optical signal to form a sixth multi-channel optical signal;

an eighth optical signal generator configured to transmit an eighth optical signal; and a seventh filter configured to combine the eighth optical signal with the sixth multi-channel optical signal to form a seventh multi-channel optical signal, wherein the seventh multi-channel optical signal is the last multi-channel optical signal.

6. The optical transmitter of claim 1, further comprising:

a block configured to support the filters, the block having at least a first pair of parallel sides and a second pair of parallel sides.

7. The optical transmitter of claim 6, wherein:

the odd-numbered filters and the even-numbered filters are on opposite sides of the first or the second pair of parallel sides.

8. The optical transmitter of claim 1, further comprising:

first through fourth lenses through which the first through the fourth optical signals pass respectively, wherein the second through fourth optical signals pass through the second through fourth lenses respectively before entering the first through third filters.

9. The optical transmitter of claim 1, wherein:

each of the first optical signal through the fourth optical signal are separated in wavelength from each other by at least 0.4 nanometers.

10. The optical transmitter of claim 1, wherein:

each of the first optical signal generator through the fourth optical signal generator comprises a laser diode.

11. The optical transmitter of claim 1, further comprising:

one or more reflective surfaces configured to align the last multi-channel optical signal with the optical transmission medium.

12. A method of forming a multi-channel optical output signal, comprising:

combining a first optical signal from a first optical signal generator with a second optical signal from a second optical signal generator to form a first multi-channel optical signal;

combining a third optical signal from a third optical signal generator with the first multi-channel optical signal to form a second multi-channel optical signal;

combining a fourth optical signal from a fourth optical signal generator with the second multi-channel optical signal to form a third multi-channel optical signal;

controlling a temperature of the first through fourth optical signal generators with a thermoelectric cooler (TEC); and passing a last multi-channel optical signal to an optical transmission medium, wherein the first optical signal and the third optical signal have parallel optical axes, the second optical signal and the fourth optical signal have parallel optical axes, and the second optical signal and the fourth optical signal have a propagation direction opposed to a propagation direction of the first optical signal and the third optical signal by an angle of from 5° to 40° with respect to the first optical signal and the third optical signal.

13. The method of claim 12, further comprising:

generating the first through the fourth optical signals;

wherein combining the first optical signal with the second optical signal comprises reflecting the first optical signal from a first filter and passing the second optical signal through the first filter, combining the third optical signal with the first multi-channel optical signal comprises reflecting the first multi-channel optical signal from a second filter and passing the third optical signal through the second filter, and combining the fourth optical signal with the second multi-channel optical signal comprises reflecting the second multi-channel optical signal from a third filter and passing the fourth optical signal through the third filter.

14. The method of claim 12, further comprising:

transmitting a fifth optical signal from a fifth optical signal generator;

combining the fifth optical signal with the third multi-channel optical signal to form a fourth multi-channel optical signal;

transmitting a sixth optical signal from a sixth optical signal generator;

combining the sixth optical signal with the fourth multi-channel optical signal to form a fifth multi-channel optical signal;

transmitting a seventh optical signal from a seventh optical signal generator;

combining the seventh optical signal with the fifth multi-channel optical signal to form a sixth multi-channel optical signal;

transmitting an eighth optical signal from an eighth optical signal generator; and combining the eighth optical signal with the sixth multi-channel optical signal to form a seventh multi-channel optical signal, wherein the seventh multi-channel optical signal is the last multi-channel optical signal.

15. A method of fabricating an optical multiplexer, comprising:

attaching at least four optical signal generators on a substrate, wherein a first optical signal generator, a second optical signal generator, a third optical signal generator and a fourth optical signal generator are configured to generate a first optical signal, a second optical signal, a third optical signal and a fourth optical signal respectively;

attaching a plurality of filters directly or indirectly to the substrate, wherein
- a first of the filters is aligned to combine the first optical signal with the second optical signal to form a first multi-channel optical signal,
- a second of the filters is aligned to combine the third optical signal with the first multi-channel optical signal to form a second multi-channel optical signal, and
- a third of the filters is aligned to combine the fourth optical signal with the second multi-channel optical signal to form a third multi-channel optical signal;

placing a thermoelectric cooler (TEC) in a location and/or position enabling the TEC to control a temperature of the first through fourth optical signal generators; and mounting one or more passive optical components directly or indirectly to the substrate, wherein the one or more passive optical components are configured to direct a last multi-channel optical signal to an optical transmission medium, wherein each of the at least four optical signal generators comprises a laser diode or light-emitting diode, the first optical signal and the third optical signal have parallel optical axes, the second optical signal and the fourth optical signal have parallel optical axes, and the second optical signal and the fourth optical signal are at an angle of from 5° to 40° with respect to the first optical signal and the third optical signal.

16. The method of claim 15, further comprising:
testing an alignment of the filters, the optical signal generators and the one or more passive optical components; and
curing an adhesive that attaches the filters, the optical signal generators, and the one or more passive optical components to the substrate once aligned.

17. The optical transmitter of claim 5, wherein the TEC is further configured to control a temperature of the fifth through eighth optical signal generators.

18. The method of claim 14, further comprising controlling a temperature of the fifth through eighth optical signal generators with the TEC.

19. The method of claim 15, further comprising attaching a fifth optical signal generator configured to transmit a fifth optical signal, a fourth filter configured to combine the fifth optical signal with the third multi-channel optical signal to form a fourth multi-channel optical signal, a sixth optical signal generator configured to transmit a sixth optical signal, a fifth filter configured to combine the sixth optical signal with the fourth multi-channel optical signal to form a fifth multi-channel optical signal a seventh optical signal generator configured to transmit a seventh optical signal, a sixth filter configured to combine the seventh optical signal with the fifth multi-channel optical signal to form a sixth multi-channel optical signal, an eighth optical signal generator configured to transmit an eighth optical signal, and a seventh filter configured to combine the eighth optical signal with the sixth multi-channel optical signal to form a seventh multi-channel optical signal, wherein the seventh multi-channel optical signal is the last multi-channel optical signal.

20. The method of claim 19, wherein the TEC further controls a temperature of the fifth through eighth optical signal generators.

* * * * *